United States Patent [19]

Inoue et al.

[11] Patent Number: 6,014,678
[45] Date of Patent: *Jan. 11, 2000

[54] APPARATUS FOR PREPARING A HYPER-TEXT DOCUMENT OF PIECES OF INFORMATION HAVING REFERENCE RELATIONSHIPS WITH EACH OTHER

[75] Inventors: Kazunori Inoue, Tokyo; Kazuo Sakushima, Kawasaki, both of Japan

[73] Assignee: Matsushita Electric Industrial Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/757,654

[22] Filed: Nov. 29, 1996

[30] Foreign Application Priority Data

Dec. 1, 1995 [JP] Japan .................................... 7-314471

[51] Int. Cl.$^7$ .................................................... G06F 17/30
[52] U.S. Cl. ........................................... 707/501; 709/218
[58] Field of Search ............................ 707/501; 345/356, 345/357; 709/218

[56] References Cited

U.S. PATENT DOCUMENTS

| | | | |
|---|---|---|---|
| 5,144,555 | 9/1992 | Takadachi et al. ...................... | 707/530 |
| 5,226,117 | 7/1993 | Miklos .................................... | 345/356 |
| 5,297,249 | 3/1994 | Bernstein et al. ...................... | 707/501 |
| 5,418,946 | 5/1995 | Mori ........................................ | 707/514 |
| 5,434,962 | 7/1995 | Kyojima et al. ........................ | 707/102 |
| 5,463,773 | 10/1995 | Sakakibara et al. ................... | 707/102 |
| 5,526,520 | 6/1996 | Krause ................................... | 707/501 |
| 5,634,062 | 5/1997 | Shimizu et al. ........................ | 707/501 |
| 5,701,137 | 12/1997 | Kiernan et al. ......................... | 345/356 |
| 5,745,895 | 4/1998 | Bingham et al. ....................... | 707/501 |
| 5,924,104 | 7/1999 | Earl ........................................ | 709/218 |

FOREIGN PATENT DOCUMENTS

| | | |
|---|---|---|
| 0483577 | 5/1992 | European Pat. Off. . |
| 0501770 | 9/1992 | European Pat. Off. . |
| 3-192462 | 8/1991 | Japan . |
| 4211865 | 8/1992 | Japan . |
| 6243024 | 9/1994 | Japan . |

OTHER PUBLICATIONS

Foss, Carolyn L., "Tools for Reading and Browsing Hypertex", Information Processing and Management, vol. 25, No. 4, pp. 407–418, Jan. 1989.

Pozzi, S. and Celentino, A. "Knowledge Based Document Filing", Institute of Electrical and Electronic Engineers Expert Systems, vol. 8, pp. 34–35, Oct. 1993.

(List continued on next page.)

*Primary Examiner*—Mark R. Powell
*Assistant Examiner*—Jeffrey Allen Rossi
*Attorney, Agent, or Firm*—Lowe Hauptman Gopstein Gilman & Berner

[57] ABSTRACT

A plurality of elements of a document is classified into a plurality of services respectively relating to a meaning, and a plurality of nodes respectively indicating one element are prepared in a node preparing unit. Therefore, each of services is a partial set of nodes. Also, a plurality of inner-service links respectively connecting a pair of nodes of the same service are prepared by an inner-service link preparing unit, so that a reference relationship between the nodes is indicated by one inner-service link. Also, a plurality of inter-service links respectively connecting a pair of nodes of different services are prepared by an inter-service link preparing unit, so that a reference relationship between the nodes of different services is indicated by one inter-service link. A hyper-text document is prepared by connecting the nodes prepared by the node preparing unit through the inner-service links for each service and connecting the nodes of the services through the inter-service links. Accordingly, because the nodes are classified into the services, the hypertext document can be easily prepared, and the hyper-text document can be easily renewed. Therefore, a user can easily manage the hyper-text document.

6 Claims, 10 Drawing Sheets

OTHER PUBLICATIONS

Stanton, Neville, "Content Analysis, a Method for Hyper-media Design", Institute of Electrical and Electronic Engineers Colliquium on 'The Authoring and Application of Hypermedia–Based User–Interfaces', pp. 7/1–7/5, Jan. 1995.

Tsuda, Koji et al., "Clustering OCR–ed Texts for Browsing Document Image Database", Proceedings on the 3rd International Conference on Document Analysis and Recoginition, I.E.E.E. Computer Society Press, vol. 1, pp. 171–174, Aug. 16, 1995.

Computer, Jan. 1988, USA, vol. 21, No. 1, ISSN 0018–9162, pp. 81–96, XP002030343, Yankelovich N Et Al: "Intermedia: the comcept and the construction of a seamless information environment".

Communications of the Association for Computing Machinery, vol. 31, No. 7, Jul. 1, 1988, pp. 820–835, XP000082176, AKSCYN R M Et Al: "KMS: A Disctibuted Hypermedia System for Managing Knowledge In Organizations".

Pfaffenberger, Bryan, "Netscape Navigator: Surfing the Web and Exploring the Internet", Boston: Academic Press, Inc., pp. 1–251, published Aug. 8, 1995.

Sekijima, Akifumi et al. Japanese Patent no. 06–243,024, translated into English by FLS, Inc., Washington D.C., pp. 1–31+figures (15 pages), Sep. 1998.

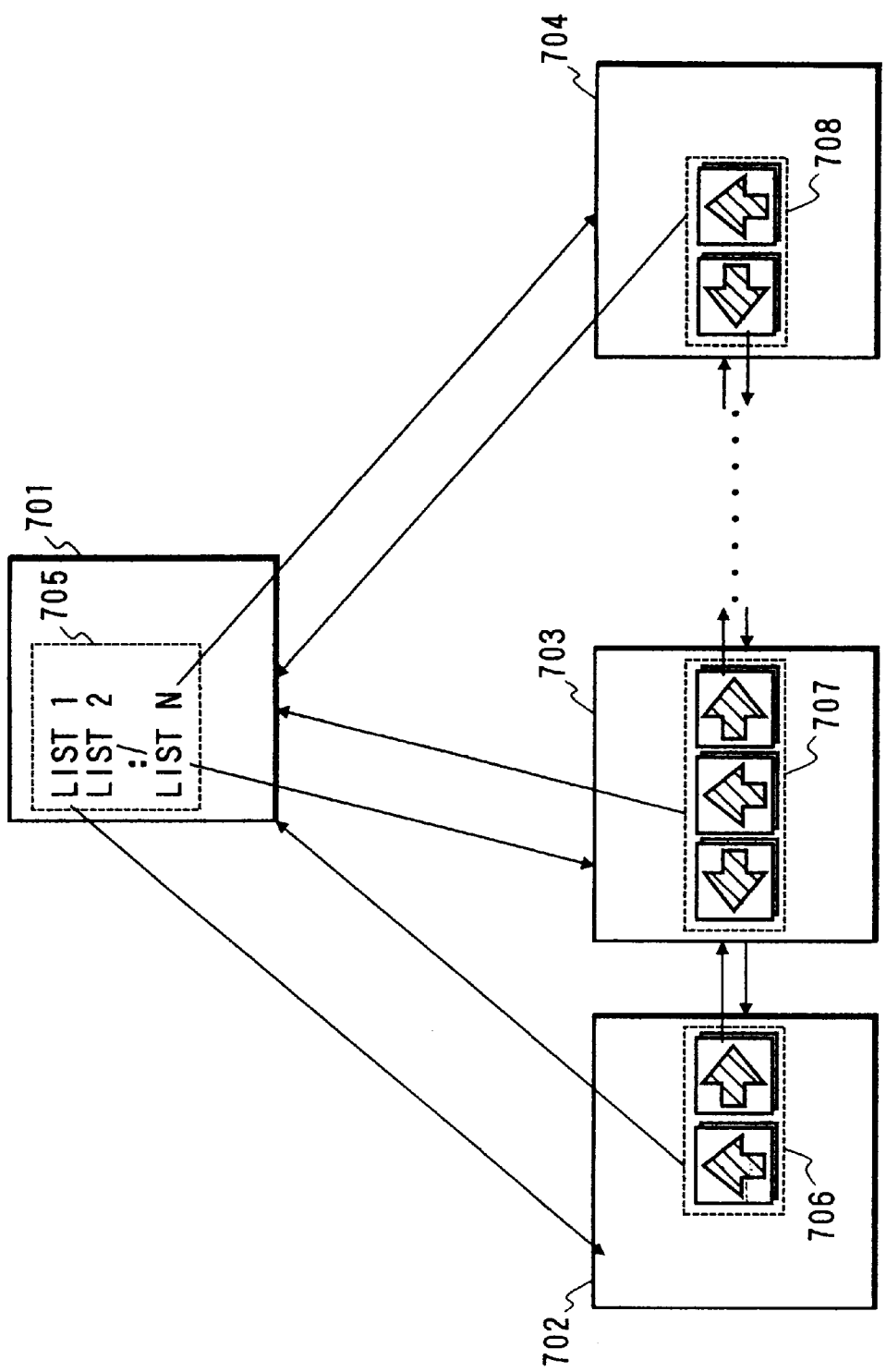

APPARATUS FOR PREPARING A HYPER-TEXT DOCUMENT OF PIECES OF INFORMATION HAVING REFERENCE RELATIONSHIPS WITH EACH OTHER

BACKGROUND OF THE INVENTION

1. Field of the Invention

The present invention relates generally to a document preparing apparatus using a computer, and more particularly to a hyper-text document preparing apparatus in which a document having a hyper-text form is prepared.

2. Description of the Related Art

The transmission and reception of information among a plurality of terminals far from each other through a computer network has been recently performed on an extensive scale. In particular, because a piece of information stored in a computer on an information supplier side has a reference relationship with another piece of information stored in the same computer or a piece of information stored in a computer on another information supplier side, an information transmitting system in which pieces of first information respectively having a reference relationship with a piece of second information are transferred from various computers having the first information to a computer having the second information has been quickly spread.

In this information transmitting system, a reference relationship among all pieces of information is expressed in a hyper-text form composed of a plurality of nodes and a plurality of links respectively connecting a pair of nodes. For example, a Hyper-Text Markup Language (HTML) which is gradually standardized in an IETF internet draft is often used to express a reference relationship among pieces of hyper-text information transmitted through a computer network. The HTML is a symbolic language based on SGML and defined in ISO (international standardization organization) 8879:1986.

The HTML is a type of page description language, and each page can be expressed by a single node or a plurality of nodes. A piece of link information for identifying both first information transmitted to second information for reference and the second information is written in an arbitrary position of a page to express each link connecting a pair of nodes by using an identifier allocated to each node. The link information indicates only a reference relationship between information, and any relationship between contents of information is not indicated by the link information.

The hyper-text is general as a data base type for the computer, and many methods and apparatuses for preparing a hyper-text type document are proposed.

2.1. Previously Proposed Art

FIG. 1 shows a conceptual information structure of a conventional hyper-text document as a first prior art.

As shown in FIG. 1, a hyper-text document is composed of a plurality of nodes respectively denoting an element of the document and a plurality of links respectively indicating a reference relationship between a pair of nodes. In the hyper-text document, a degree of freedom in the reference relationship between a pair of nodes is high, so that an information structure of the hyper-text document can be variously designed. In contrast, because the number of links is increased with the number of nodes, there is a drawback that a linking relationship among the nodes is complicated. That is, in cases where the linking relationship among the nodes is complicated in the hyper-text document, it is troublesome for a document preparing person to maintain the hyper-text document, and it is difficult for a document reading person to understand the hyper-text document and find out a particular node. Also, it is difficult to manage a plurality of nodes as a set, it is required to add a large number of links for one or more nodes relating to a particular node each time the particular node is newly added, and it is required to revise a large number of links for one or more nodes relating to a particular node each time the particular node is newly added.

In other prior arts for the hyper-text document preparing apparatus, a link management can be easily performed. For example, as a second prior art, a Published Unexamined Japanese Patent Application No. H3-192462 (1991) and a Published Unexamined Japanese Patent Application No. H4-211865(1992) are proposed. In these applications, the relationship among a plurality of documents having a plurality of predetermined formats is defined in advance, so that the necessity for spreading a link each time a document is prepared is eliminated. As a third prior art, a Published Unexamined Japanese Patent Application No. H6-243024 (1994) is proposed. In this application, a concept of nodes and links is extended to a new concept of fields and anchors, each field is composed of a plurality of nodes arranged in a set, each field has information relating to a meaning represented by a node set of field, so that a relationship in meaning between nodes is clarified.

Therefore, in the second and third prior arts, a link concept denoting the simple reference relationship between the nodes included in the hyper-text document is extended, and the difficulty in the link management is improved.

2.2. Problems to be Solved by the Invention

However, in the first prior art, because each link of the hyper-text document written according to the conventional HTML has only a function of reference from one node to another node, an interface used as a reading means is used for only reference.

Also, in the second prior art, a document to be prepared is limited to a plurality of predetermined format types of documents relating to each other such as a specification document, an account document or the like. Therefore, the first prior art is not appropriate for a hyper-text document preparing apparatus in which a plurality of types of documents having various formats are used. That is, because a format of the document is limited to one of the predetermined formats, a degree of freedom in expressing the document is lowered.

Also, in the third prior art, because an interface used by a reader depends on contents of the field, the link management for documents performed by using the same interface cannot be simplified. That is, a reader is required to understand the meaning represented by a node set of field and to use an interface corresponding to the meaning for the purpose of referring to the field for a piece of particular information relating to the meaning, so that the interface used as a reading means is limited.

SUMMARY OF THE INVENTION

An object of the present invention is to provide, with due consideration to the drawbacks of such a conventional hyper-text document preparing apparatus, a hyper-text document preparing apparatus in which a document preparing person easily performs a link management and a reader easily refer to a particular node for a piece of particular information indicated by the particular node.

The object is achieved by the provision of a hyper-text document preparing apparatus, comprising:

document classifying means for classifying a plurality of elements of a document into a plurality of services;

node preparing means for preparing a plurality of nodes respectively indicating one element of the document for each of the services classified by the document classifying means, each of the services denoting a partial set of nodes;

inner-service link preparing means for preparing a plurality of inner-service links respectively connecting one pair of nodes of the same service classified by the document classifying means to make a reference relationship from one node to another node;

inter-service link preparing means for preparing a plurality of inter-service links respectively connecting two nodes of the different services classified by the document classifying means to make a reference relationship from one node of a service to one node of another service; and a hyper-text document preparing means for preparing a hyper-text document from the nodes prepared by the node preparing means, the inner-service links prepared by the inner-service link preparing means and the inter-service links prepared by the inter-service link preparing means.

In the above configuration, because a plurality of elements of a document are classified into a plurality of services by the document classifying means, when a plurality of nodes respectively indicating one element of the document are prepared by the node preparing means, the nodes are classified into the services, and each of the service is a partial set of nodes. Thereafter, a hyper-text document is prepared by connecting each pair of nodes placed in the same service through an inner-service link and connecting each pair of nodes placed in different services through an inter-service link.

In this case, when one or more nodes are added or deleted to/from a particular service, the hyper-text document can be easily renewed because the nodes of the hyper-text document are classified into the services.

Accordingly, the hyper-text document can be easily managed. Also, in cases where each of the services relates to a meaning, a reader can easily refer to a particular node of a particular service for a piece of information indicated by the particular node.

It is preferred that the inner-service link preparing means of the hyper-text document preparing apparatus comprise:

structural information storing means for storing a piece of service structural information indicating a layout of the nodes placed in the same service for each of the services;

button form generating means for automatically generating a button form according to one piece of service structural information relating to a particular service selected by a user, the button form denoting a form of a button which is equivalent to an element expressing one inner-service link; and button setting means for automatically setting a button in each of the nodes of the particular service and automatically allocating the button form generated by the button form generating means to each of the buttons to automatically connect the nodes of the particular service with each other in the layout indicated by the piece of service structural information.

In the above configuration, a layout of the nodes placed in each of the services is predetermined, and the layout of the nodes for each service is stored in the structural information storing means as the service structural information. When a preparation instruction indicating the preparation of a particular service is input by a user, a button form is automatically generated by the button form generating means according to one piece of service structural information relating to the particular service. In this case, a reference node having a reference relationship with a node to which a button is set is designated by a button form allocated to the button, and the button expresses an element of one inner-service link. Thereafter, a button is set in each of the nodes of the particular service, and the button form is automatically allocated to each of the buttons by the button setting means.

Accordingly, in cases where a layout of the nodes for each service is predetermined, the user can easily prepare each of services without considering the layout of the nodes.

It is also preferred that the nodes prepared by the node preparing means for the particular service be ranked according to the piece of service structural information by the button form generating means, the button form indicating that a reference position proceeds from a first node to a second node having a rank lower than the first node by one rank and another reference position returns from the first node to a third node having a rank higher than the first node by one rank be generated by the button form generating means, and the buttons to which the button form is allocated be set in the nodes of the particular service by the button setting means to arrange the nodes of the particular service in the ranked order.

In this case, because each of the nodes in which the button with the button form is set is connected with a node having a higher rank and another node having a lower rank, the nodes of the particular service can be easily arranged in the ranked order.

It is also preferred that the nodes prepared by the node preparing means for the particular service be classified into a parent node and a plurality of child nodes according to the piece of service structural information by the button form generating means, a first type of button form indicating that a reference position proceeds to one child node be generated by the button form generating means, a second type of button form indicating that a reference position proceeds to the parent node be generated by the button form generating means, the first type of button form is allocated to a parent button set in the parent node of the particular service by the button setting means, and the second type of button form is allocated to each of a plurality of child buttons set in the child nodes by the button setting means to arrange the child nodes of the particular service in parallel to each other.

In this case, the particular service of the hyper-text document in which a parent node is arranged as a representative node and a plurality of child nodes arranged in parallel to each other are respectively connected with the parent node can be easily prepared.

It is also preferred that the nodes prepared by the node preparing means for the particular service are classified into a parent node and a plurality of ranked child nodes according to the piece of service structural information by the button form generating means, a first type of button form indicating that a reference position proceeds to each of the child nodes is generated by the button form generating means, a second type of button form indicating that a first reference position proceeds to the parent node and a second reference position proceeds from a first child node to a second child node having a rank lower than the first child node by one rank and a third reference position returns from the first child node to a third child node having a rank higher than the first child node by one rank, the first type of button form is allocated to a parent button set in the parent node of the particular service by the button setting means, and the second type of button form is allocated to each of a plurality of child buttons set in the child nodes by the button setting means to arrange the child nodes of the particular service in the ranked order.

In this case, the particular service of the hyper-text document in which a plurality of child nodes connected to be arranged in the ranked order are respectively connected with a parent node can be easily prepared.

BRIEF DESCRIPTION OF THE DRAWINGS

The objects, features and advantages of the present invention will be apparent from the following description taken in conjunction with the accompanying drawings, in which:

FIG. 11 shows a parent node and a plurality of child nodes arranged in a ranked order and connected with the parent node by a plurality of buttons according to the fifth embodiment.

DETAILED DESCRIPTION OF THE EMBODIMENTS

Preferred embodiments of a hyper-text document preparing apparatus according to the present invention are described with reference to drawings.

(First Embodiment)

Figure 1:
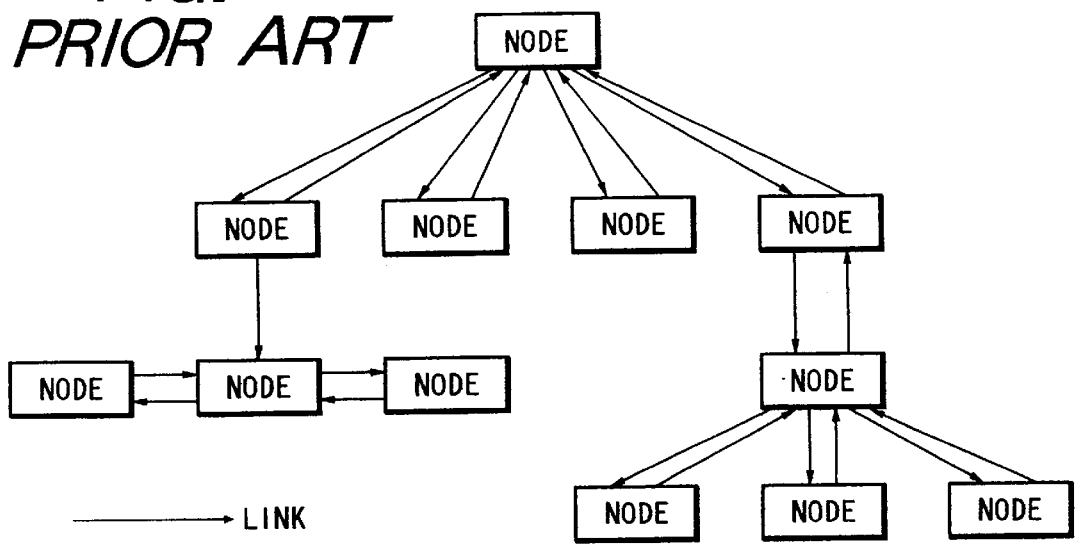
FIG. 1 shows a conceptual information structure of a conventional hyper-text document as a first prior art.
Figure 2:
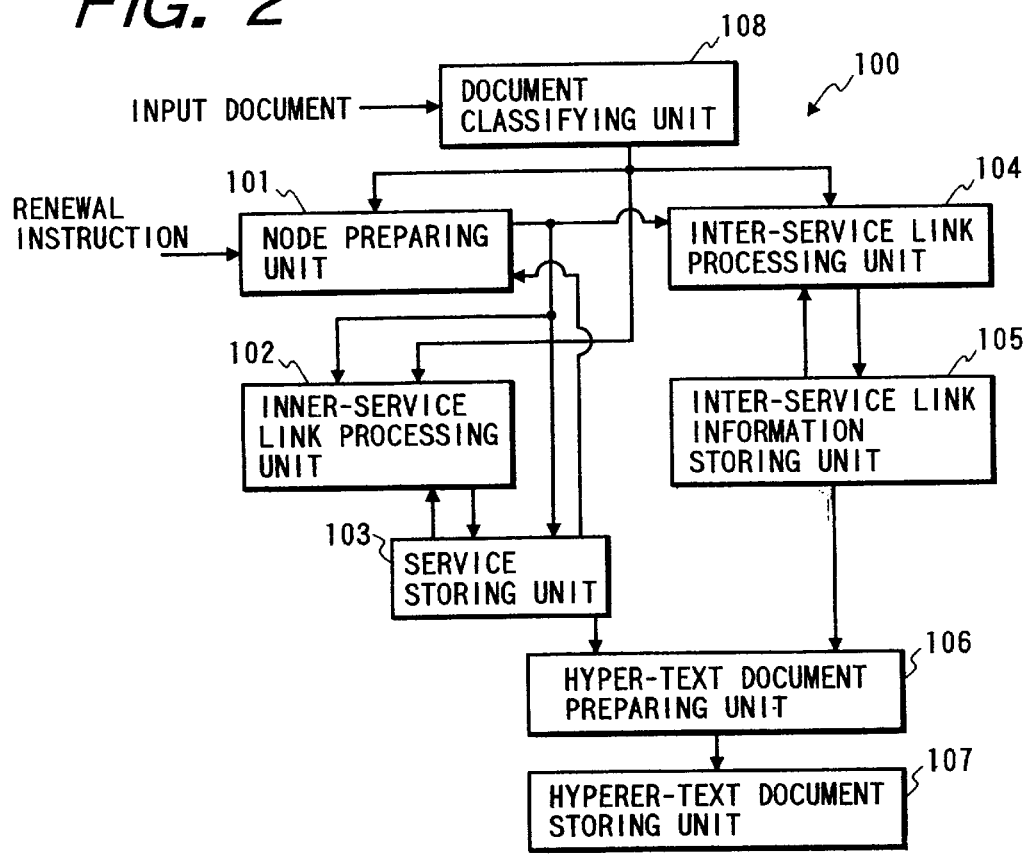
FIG. 2 is a block diagram of a hyper-text document preparing apparatus according to a first embodiment of the present invention.

FIG. 2 is a block diagram of a hyper-text document preparing apparatus according to a first embodiment of the present invention.

As shown in FIG. 2, a hyper-text document preparing apparatus 100 comprises a document classifying unit 108 for classifying a plurality of elements of an input document into a plurality of services respectively relating to a meaning, a node preparing unit 101 for preparing a plurality of nodes respectively denoting one element of the input document for each of the services classified in the document classifying unit 108 and add or delete one or more nodes to/from one service in a renewal operation, an inner-service link processing unit 102 for preparing one or more inner-service links respectively connecting a pair of nodes placed in the same service and adding or deleting one or more inner-service links to/from each service in the renewal operation, a service storing unit 103 for storing a plurality of services each of which is composed of the nodes and the inner-service links prepared, renewed or deleted in the node preparing unit 101 and the inner-service link processing unit 102, an inter-service link preparing unit 104 for preparing one or more inter-service links respectively connecting two nodes placed in the different services and adding or deleting one or more inter-service links in the renewal operation, an inter-service link information storing unit 105 for storing the inter-service links prepared, renewed or deleted in the inter-service link processing unit 104 as inter-service link information, a hyper-text document preparing unit 106 for preparing a hyper-text document composed of the nodes of the services, the inner-service links stored in the service storing unit 103 and the inter-service links stored in the inter-service link information storing unit 105, and a hyper-text document storing unit 107 for storing the hyper-text document prepared in the hyper-text document preparing unit 106.

Each of a plurality of elements of a hyper-text document is indicated by a node, the hyper-text document composed of a plurality of nodes and a plurality of links are classified into a plurality of services, and all nodes in each service relate to the same meaning. Therefore, each service is a unit to be edited in the hyper-text document preparing apparatus 100, and each service is a partial set of nodes composing the hyper-text document. All nodes in each service are connected with each other through one or more inner-service links, and one of the nodes in one service is connected with one of the nodes in another service through one of the inter-service links. Therefore, two pieces of information indicated by a pair of nodes which are connected with each other through one inner-service link have a reference relationship and relate to the same meaning, and two pieces of information indicated by a pair of nodes which are connected with each other through one inter-service link have a reference relationship and have the difference meanings.

Also, each service has a representative node, and the representative node of each service is connected with each of all nodes placed in the same service through one inner-service link. In cases where a first service is connected with one node of a second service without specifying any node of the first service, the representative node of the first service is connected with one of the nodes of the second service through one inter-service link.

In the above configuration of the hyper-text document preparing apparatus 100, when a hyper-text document is newly prepared, a plurality of elements of an input document are classified into a plurality of services respectively relating to a meaning in the document classifying unit 108, and a plurality of nodes (including a representative node) corresponding to the elements of the input document are prepared in the node preparing unit 101 for each of the services. Therefore, each of the services is a partial set of nodes. Thereafter, one or more inner-service links connecting the nodes placed in the same service are prepared for each service in the inner-service link processing unit 102, one or more inter-service links respectively connecting two nodes placed in two different services are prepared as inter-service link information in the inter-service link processing unit 104, the nodes and the inner-service links are stored in the service storing unit 103, and the inter-service links are stored in the inter-service link information storing unit 105.

Thereafter, a hyper-text document is prepared in the hyper-text document preparing unit 106 according to the nodes, inner-service links and inter-service links stored in the units 103 and 105, and the hyper-text document is stored in the hyper-text document storing unit 107.

Figure 3:
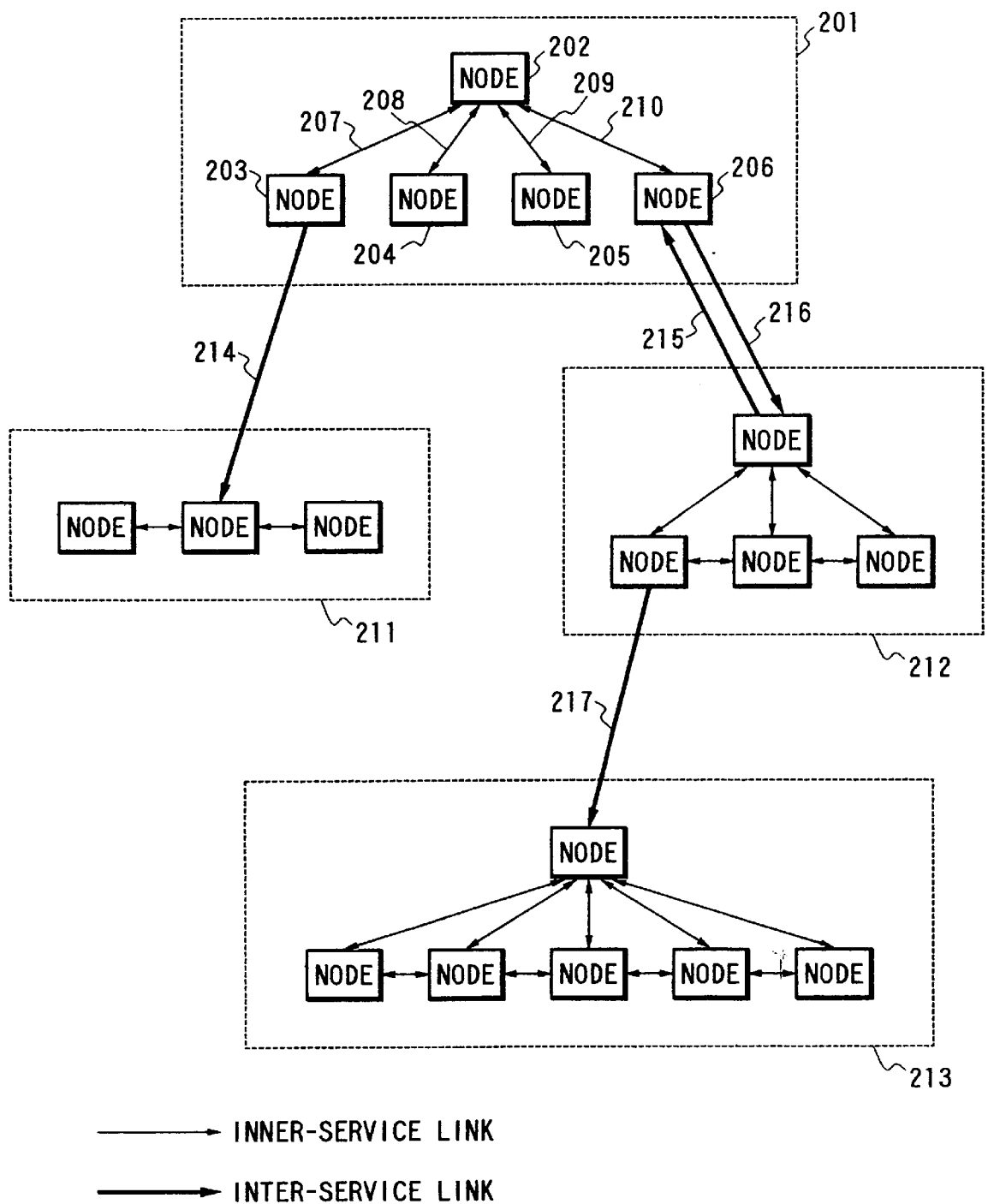
FIG. 3 shows an example of a hyper-text document prepared by the hyper-text document preparing apparatus shown in FIG. 2.

Therefore, as shown in FIG. 3, a plurality of services 201, 211, 212 and 213 are, for example, prepared, a representative node 202 and a plurality of nodes 203 to 206 connected with the representative node 202 through one of a plurality of inner-service links 207 to 210 are placed in the service 201, one of a plurality of nodes connected with each other in the service 211 is connected with the node 203 of the service 201 through a one-way type inter-service link 214, a representative node of the service 212 is connected with the node 206 of the service 201 through a pair of one-way type inter-service links 215 and 216, and a representative node of the service 213 is connected with one of the nodes in the service 212 through a one-way type inter-service link 217.

Thereafter, in cases where a renewal instruction indicating the renewal (addition or deletion) of one or more particular nodes of a particular service in the hyper-text document is input to the node preparing unit 101, the nodes of the particular service are read out from the service storing unit 103 to the node preparing unit 101, the inner-service links connecting the nodes of the particular service are read out from the service storing unit 103 to the inner-service link processing unit 102, and the inter-service links respectively connecting one node of the particular service and one node of another service are read out from the inter-service link information storing unit 105 to the inter-service link processing unit 104.

In the node preparing unit 101, the particular nodes are added to the particular service or the particular nodes of the particular service are deleted from the particular service in the node preparing unit 101, and the nodes of a renewed particular service are stored in the service storing unit 103. Also, one or more inner-service links relating to the particular nodes are added or deleted to/from a group of the inner-service links read out from the service storing unit 103, and a renewed group of the inner-service links are stored in the service storing unit 103. Also, one or more inter-service links relating to the particular nodes are added or deleted to/from a group of the inter-service links read out from the service storing unit 103, and a renewed group of the inter-service links are stored in the service storing unit 103. Thereafter, a renewed hyper-text document is prepared in the hyper-text document preparing unit 106 according to the nodes, inner-service links and inter-service links stored in the units 103 and 105, and the renewed hyper-text document is stored in the hyper-text document storing unit 107.

Accordingly, because the hyper-text document is treated as a set of a plurality of services independent from each other, the hyper-text document can be efficiently prepared by preparing each of the services of the document. That is, a plurality of nodes relating to the same meaning can be efficiently prepared.

Also, because the hyper-text document is classified into a plurality of services respectively relating to one meaning, the renewal of the hyper-text document can be easily performed, so that a document preparing person can easily manage the hyper-text document.

Also, because the hyper-text document is classified into a plurality of services respectively relating to one meaning, a reader can easily refer to a particular node relating to a particular meaning for a piece of particular information indicated by the particular node.

In the first embodiment, each node is placed in one service. However, it is applicable that a node be simultaneously placed in a plurality of services. This type of node is called a common node in this specification.

Figure 4:
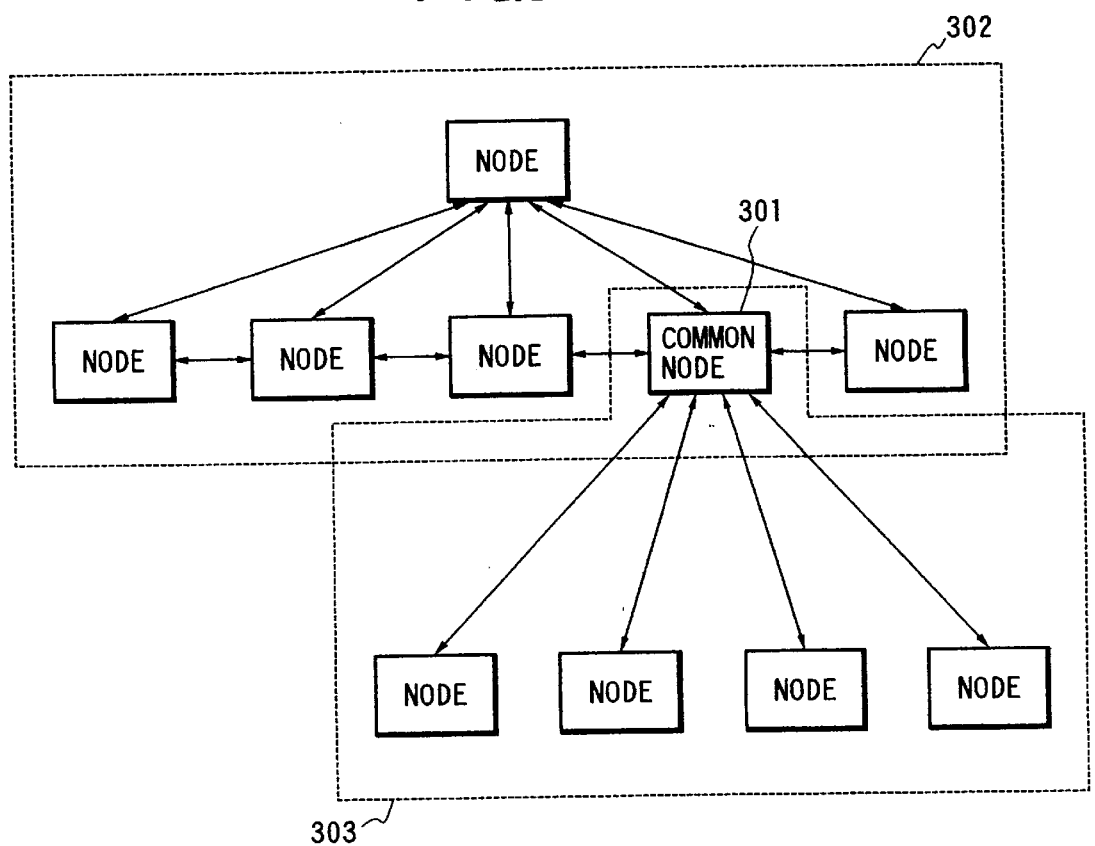
FIG. 4 shows another example of a hyper-text document prepared by the hyper-text document preparing apparatus shown in FIG. 2.

FIG. 4 shows an example of a pair of services in which a common node is placed.

As shown in FIG. 4, one of a plurality of nodes in the service 302 is a common node 301, and the common node 301 functions as a representative node of a service 303. In this case, a piece of first information indicating the substance of the common node 301 is included in one of the services, and a piece of second information used for reference is included in another service.

(Second Embodiment)

Figure 5:
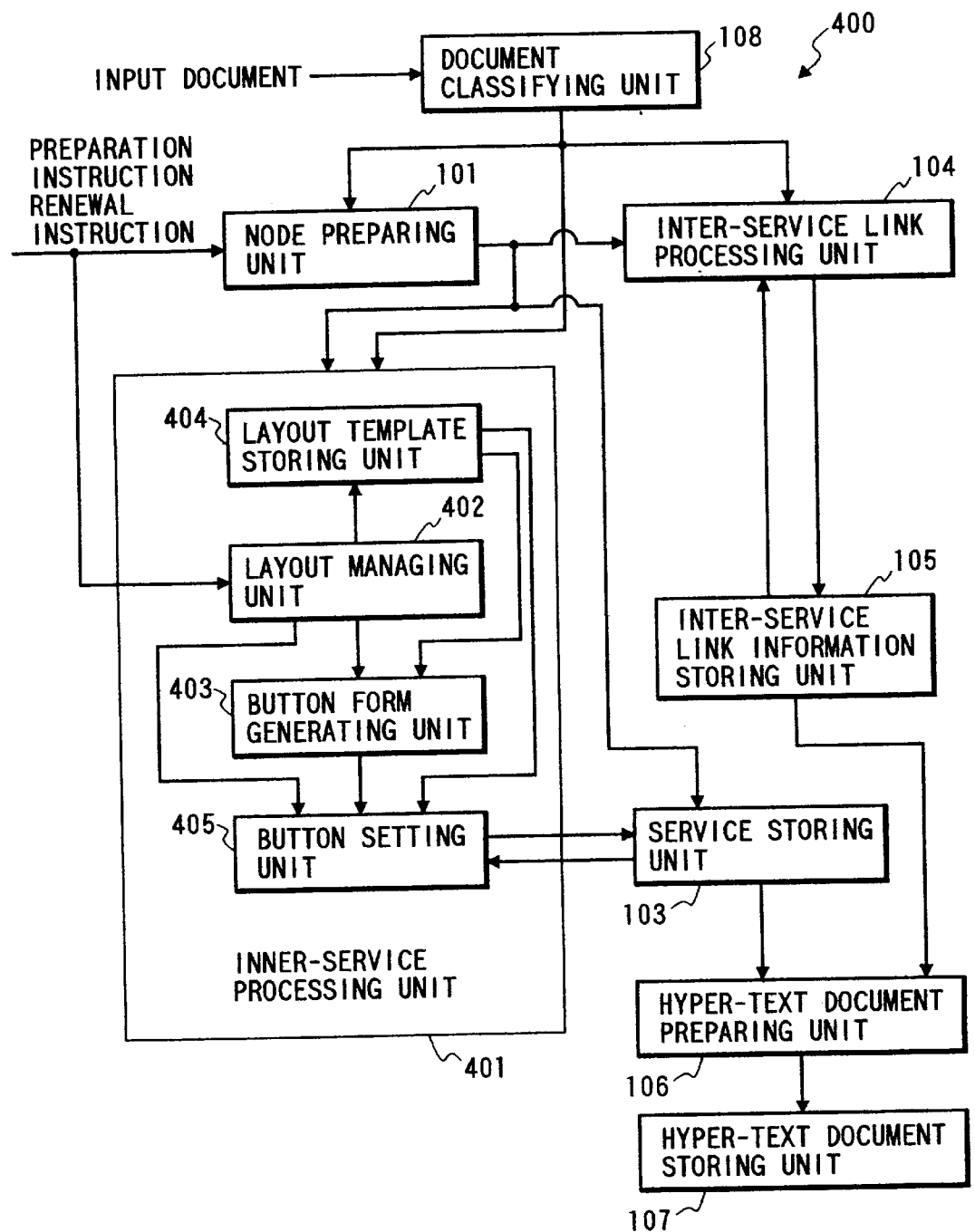
FIG. 5 is a block diagram of a hyper-text document preparing apparatus according to a second embodiment of the present invention.

FIG. 5 is a block diagram of a hyper-text document preparing apparatus according to a second embodiment of the present invention.

As shown in FIG. 5, a hyper-text document preparing apparatus 400 comprises
the node classifying unit 108, the node preparing unit 101,
an inner-service link processing unit 401 for preparing a plurality of inner-service links respectively connecting a pair of nodes placed in the same service on condition that a layout of the nodes connected with each other through the inner-service links in the same service is predetermined,
adding or deleting one or more inner-service links to/from one service in the renewal operation on condition that a layout of the nodes in the renewed service is predetermined,
the service storing unit 103, the inter-service link processing unit 104, the inter-service link information storing unit 105, the hyper-text document preparing unit 106, and the hyper-text document storing unit 107.

In the second and following embodiments, an element expressing one inner-service link is called a button. That is, when one button is set in a node, one inner-service link connected with the node is prepared.

The inner-service link processing unit 401 comprises a layout template storing unit 404 for storing pieces of service structural information respectively indicating a structure of one service in which a plurality of nodes are connected with each other through a plurality of inner-service links,
a layout managing unit 402 for managing the preparation of the hyper-text document by selecting out each of pieces of service structural information of the services stored in the layout template storing unit 404 according to a preparation instruction and managing the renewal of a particular service by selecting out one piece of service structural information of the particular service according to a renewal instruction,
a button form generating unit 403 for automatically generating one or more types of button forms according to the service structural information automatically selected under the management of the layout managing unit 402, one button form denoting a form of a button which expresses an element of one inner-service link, and a reference node having a reference relationship with a node to which one button is set being designated by one button form allocated to the button, and
a button setting unit 405 for automatically setting a plurality of buttons in the nodes prepared by the node preparing unit 101 in one-to-one correspondence and automatically allocating the types of button forms generated in the button form generating unit 403 to the buttons in one-to-one correspondence according to the service structural information to arrange the nodes of each service in a predetermined layout.

One or more types of button forms are automatically generated in the button form generating unit 403, each type of button form is allocated to one or more corresponding buttons set in the nodes according to the service structural information, so that a type of one button is determined by the type of button form allocated to the button. That is, each type of button form is composed of a piece of information indicating an expression method of the button and a piece of link information indicating a pair of nodes connected with each other by the button, and each type of button form corresponds to one or more buttons.

The service structural information are stored in the layout template storing unit 404 in advance and respectively indicate a reference relationship among all nodes in the same service. Each of the service structural information is composed of a piece of layout information indicating a geometrical layout of all nodes in the same service, a piece of information about one or more types of button forms and a piece of information indicating a maintenance method for a plurality of inner-service links in a node renewal such as a node addition or a node deletion. Each of the layout information is called a layout template in this specification.

In the above configuration of the hyper-text document preparing apparatus 400, when a user intends to newly prepare a particular service, the user specifies the particular service, a particular layout template corresponding to the particular service is selected from various layout templates stored in the layout template storing unit 404 under the management of the layout managing unit 402. That is, a structure of the particular service is determined in advance in this embodiment. Thereafter, a button form for each of a plurality of buttons set in a plurality of nodes of the particular service is automatically generated in the button form generating unit 403 according to the button form information of the particular layout template, and the button form is allocated to each of the buttons set in the nodes of the particular service according to the layout information of the particular layout template in the button setting unit 405 to arrange the nodes of the particular service in a predetermined layout. Therefore, the particular service is prepared and is stored in the service storing unit 103.

Also, when a user intends to add a particular node to a particular service, the user specifies the addition of the particular node to the particular service, and a piece of maintenance method information of a particular layout template corresponding to the particular service is selected from various layout templates stored in the layout template storing unit 404 under the management of the layout managing unit 402. Thereafter, a button to which a button form is allocated is set in the particular node in the button setting unit 405 according to the maintenance method information to renew the particular service, and the renewed particular service is stored in the service storing unit 103. In this case, the addition of the particular node is performed in the node preparing unit 101.

Also, when a user intends to delete a particular node from a particular service, the user specifies the deletion of the particular node from the particular service, and a piece of maintenance method information of a particular layout template corresponding to the particular service is selected from various layout templates stored in the layout template storing unit 404 under the management of the layout managing unit 402. Thereafter, one or more buttons relating to the deletion of the particular node are renewed according to the maintenance method information in the button setting unit 405 to renew the particular service, and the renewed particular service is stored in the service storing unit 103. In this case, the deletion of the particular node is performed in the node preparing unit 101.

Accordingly, because the service structure such as a geometrical layout of all nodes in the same service, one or more button forms allocated to the buttons in the same service and a maintenance method is determined in advance for each service, a button form can be automatically generated, and the button form can be allocated to each of the buttons to prepare or renew a service. That is, the preparation or renewal of each inner-service link can be replaced with the preparation or renewal of each button set in one node, and the preparation or renewal of each inner-service link can be efficiently performed without considering each pair of nodes connected with each other through one inner-service link.

(Third Embodiment)

Figure 6:
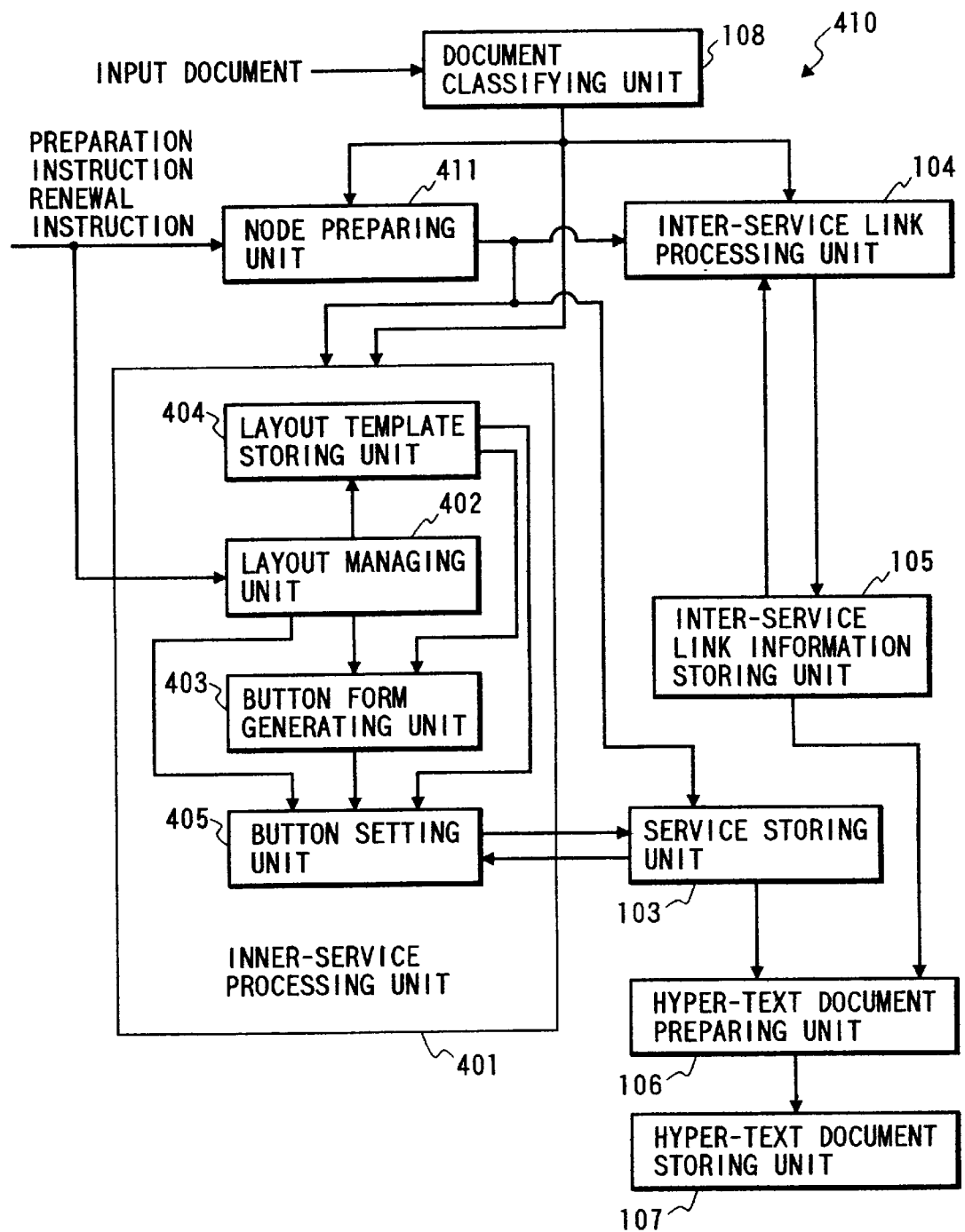
FIG. 6 is a block diagram of a hyper-text document preparing apparatus according to a third embodiment of the present invention.

FIG. 6 is a block diagram of a hyper-text document preparing apparatus according to a third embodiment of the present invention.

As shown in FIG. 6, a hyper-text document preparing apparatus 410 comprises the node classifying unit 108, a node preparing unit 411 for preparing a plurality of nodes expected to be ranked in a predetermined order for each service and add or delete one or more nodes to/from one service in a renewal operation, the inner-service link processing unit 401 for preparing a plurality of inner-service links (or buttons) to serially connect the nodes placed in the same service in the ranked order according to the service structural information, adding or deleting one or more inner-service links to/from one service in the renewal operation on condition that a layout of the nodes in the renewed service is predetermined to serially arrange the nodes in the ranked order, the service storing unit 103, the inter-service link processing unit 104, the inter-service link information storing unit 105, the hyper-text document preparing unit 106, and the hyper-text document storing unit 107.

Figure 7:
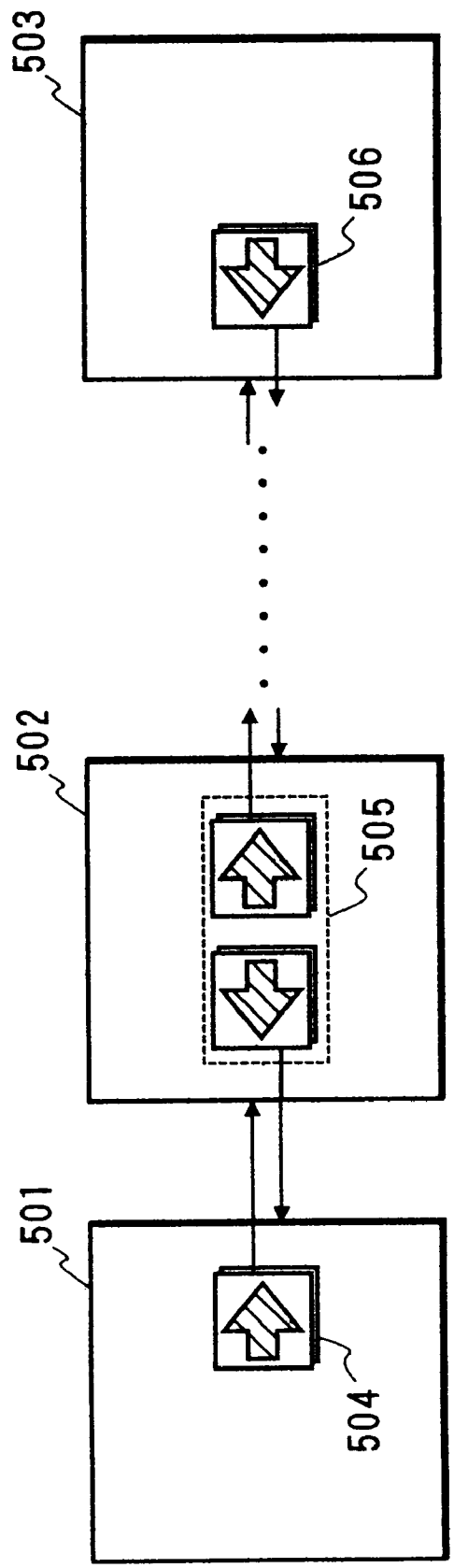
FIG. 7 shows a plurality of nodes connected with each other in a ranked order by a plurality of buttons according to the third embodiment.

In the above configuration, as shown in FIG. 7, when a user intends to newly prepare a particular service, the user specifies the particular service, and a plurality of nodes including a top node 501, one or more intermediary nodes 502 and a final node 503 ranked in that order are prepared in the node preparing unit 411. Thereafter, a first type of button form indicating that a reference position proceeds from a first node to a second node having a rank lower than the first node by one rank is automatically generated in the button form generating unit 403 according to the service structural information and is allocated to a top button 504, a second type of button form indicating that a reference position proceeds from a first node to a second node having a rank lower than the first node by one rank and another reference position returns from the first node to a third node having a rank higher than the first node by one rank is automatically generated in the button form generating unit 403 according to the service structural information and is allocated to each of one or more intermediary buttons 505, and a third type of button form indicating that a reference position returns from a first node to a second node having a rank higher than the first node by one rank is automatically generated in the button form generating unit 403 according to the service structural information and is allocated to a final button 506. Thereafter, the top button 504 is set in the top node 501, each of the intermediary buttons 505 is set in one of the intermediary nodes 502, and the final button 506 is set in the final node 503. Therefore, the nodes 501 to 503 are arranged in the ranked order. In this case, because the top node 501 has the highest rank, the top node 501 functions as a representative node of the particular service.

Accordingly, because the buttons 504 to 506 to which the first, second or third type of button form is allocated is automatically set in the top, intermediary and final nodes 501 to 503, a service having a reference relationship among the nodes 501 to 503 arranged in the ranked order can be easily obtained and managed.

Also, a service in which a plurality of nodes are arranged in the ranked order can be efficiently prepared and managed.

(Fourth Embodiment)

Figure 8:
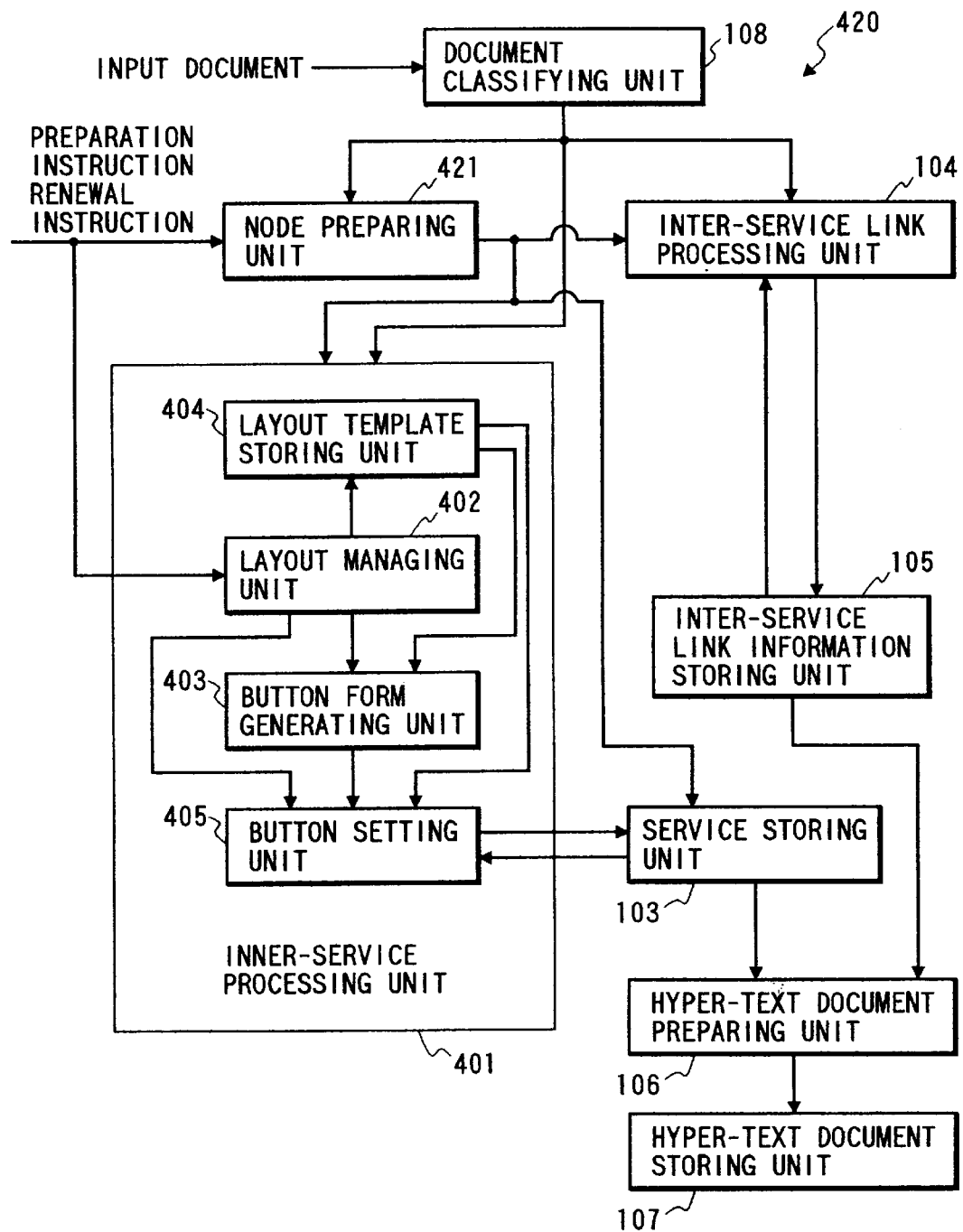
FIG. 8 is a block diagram of a hyper-text document preparing apparatus according to a fourth embodiment of the present invention.

FIG. 8 is a block diagram of a hyper-text document preparing apparatus according to a fourth embodiment of the present invention.

As shown in FIG. 8, a hyper-text document preparing apparatus 420 comprises
the node classifying unit 108,
a node preparing unit 421 for preparing a plurality of nodes which are expected to be classified into a parent node and one or more child nodes arranged in parallel to each other for each service and add or delete one or more child nodes to/from one service in a renewal operation,
the inner-service link processing unit 401 for preparing a plurality of inner-service links (or buttons) to connect the parent node and each of the child nodes placed in the same service according to the service structural information, adding or deleting one or more inner-service links to/from one service in the renewal operation on condition that a layout of the nodes in the renewed service is predetermined to arrange the child nodes in parallel,
the service storing unit 103, the inter-service link processing unit 104, the inter-service link information storing unit 105, the hyper-text document preparing unit 106, and the hyper-text document storing unit 107.

Figure 9:
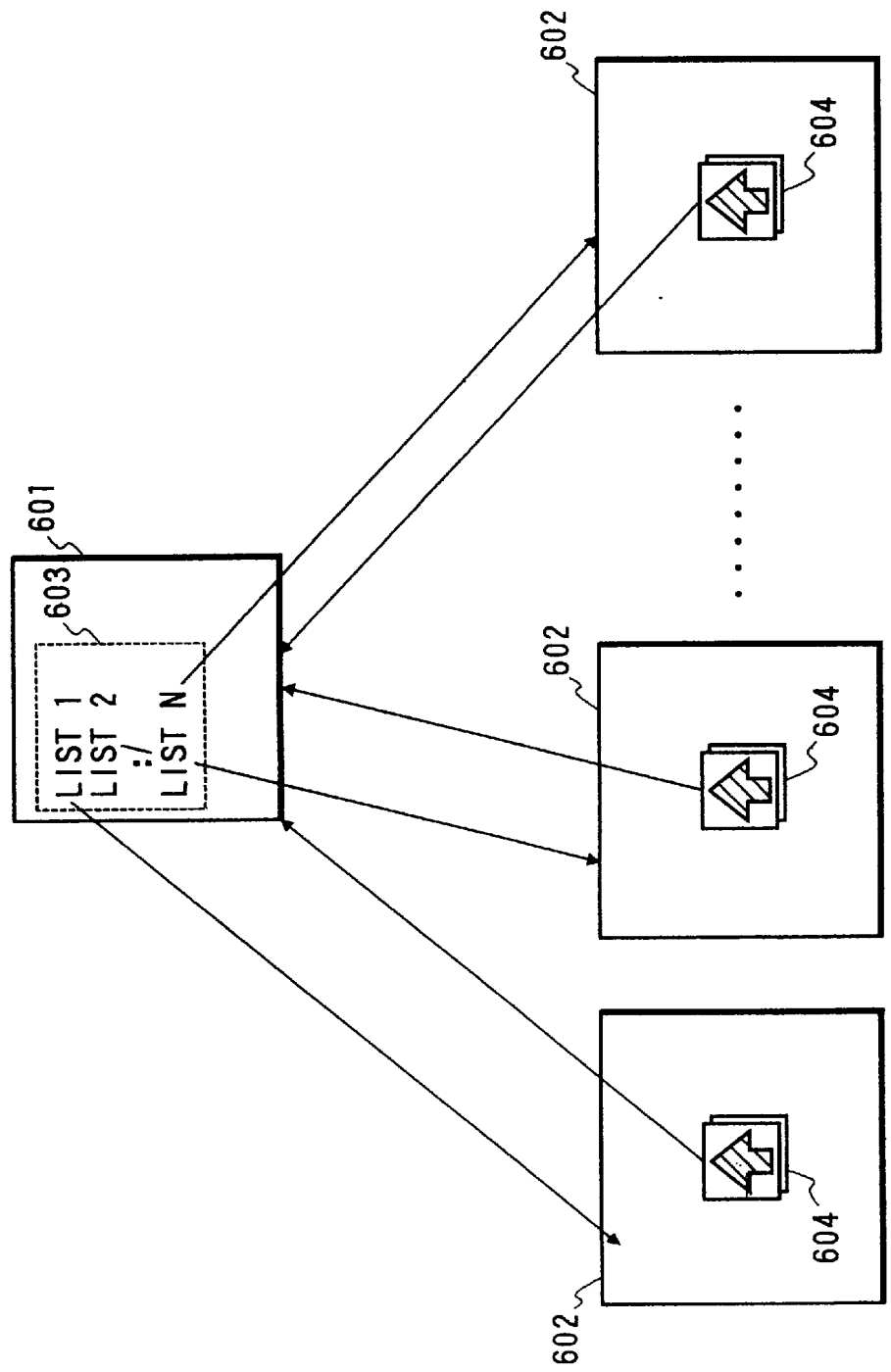
FIG. 9 shows a parent node and a plurality of child nodes connected with the parent node by a plurality of buttons according to the fourth embodiment.

In the above configuration, as shown in FIG. 9, when a user intends to newly prepare a particular service, the user specifies the particular service, and a parent node 601 and a plurality of child nodes 602 are prepared in the node preparing unit 411. In this case, it is expected that the child nodes are arranged in parallel to each other. Thereafter, a first type of button form indicating that a reference position proceeds to each child node 602 is automatically generated in the button form generating unit 403 according to the service structural information and is allocated to a patent button 603, and a second type of button form indicating that a reference position proceeds to the parent node 601 is automatically generated in the button form generating unit 403 according to the service structural information and is allocated to each of a plurality of child buttons 604. Thereafter, the parent button 603 is set in the parent node 601, and each of the child buttons 604 is set in one child node 602.

In this case, a plurality of headlines of pieces of information indicated by the child nodes 602 are indicated by the parent node 601 in a list form, and the parent node 601 functions as a representative node of the particular service.

Accordingly, because the button 603 to which the first type of button form is allocated is automatically set in the parent node 601 and the button 602 to which the second type of button form is allocated is automatically set in each of the child nodes 602, a service having a reference relationship from a piece of information indicated by the parent node 601 to a piece of information indicated by each of the child nodes 602 and another reference relationship from a piece of information indicated by each of the child nodes 602 to a piece of information indicated by the parent node 601 can be easily obtained and managed.

Also, a service in which one parent node is connected with each of a plurality of child nodes arranged in parallel to each other can be efficiently prepared or renewed.

(Fifth Embodiment)

Figure 10:
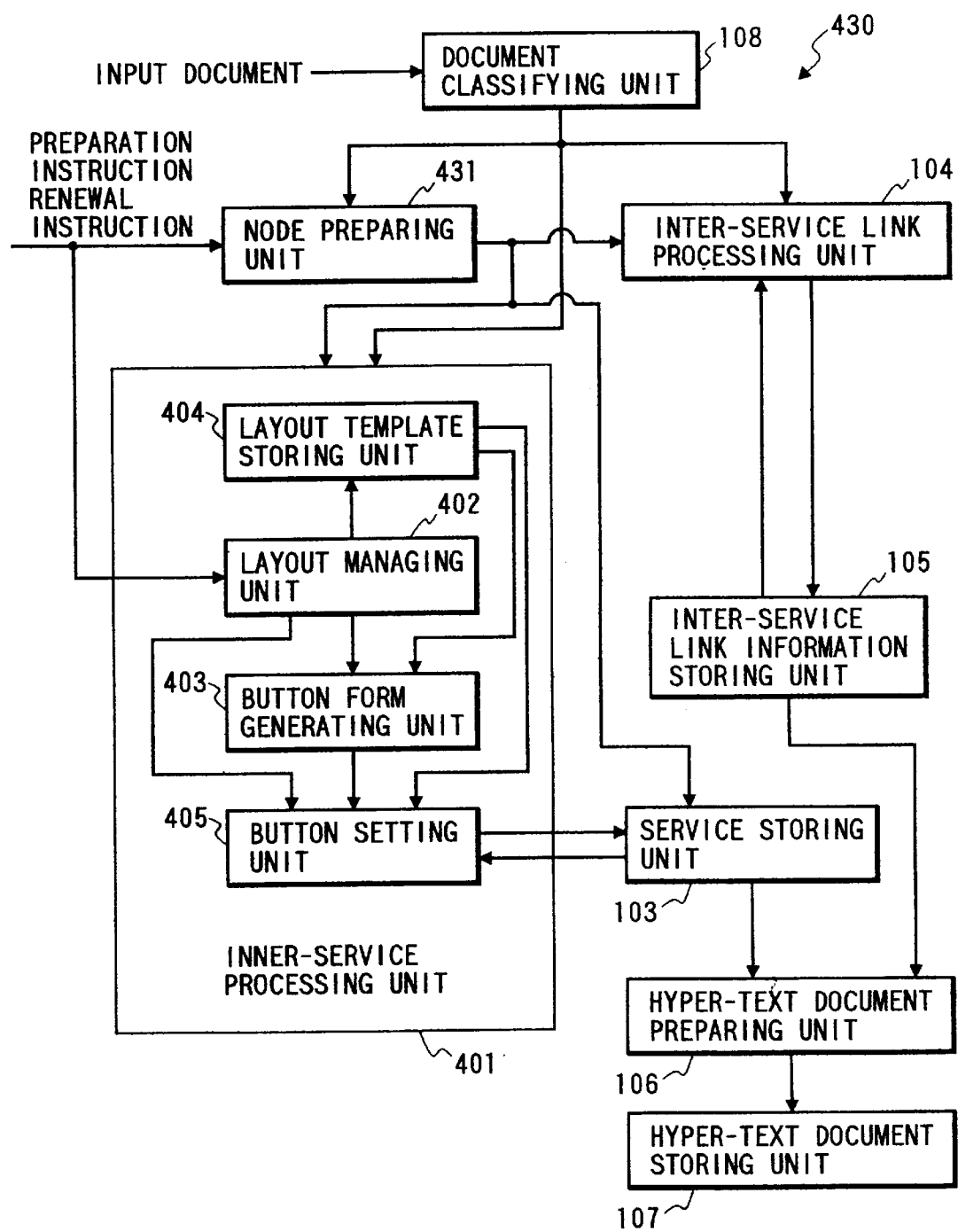
FIG. 10 is a block diagram of a hyper-text document preparing apparatus according to a fifth embodiment of the present invention.

FIG. 10 is a block diagram of a hyper-text document preparing apparatus according to a fifth embodiment of the present invention.

As shown in FIG. 10, a hyper-text document preparing apparatus 430 comprises
the node classifying unit 108,
a node preparing unit 431 for preparing a plurality of nodes which are expected to be classified into a parent node and a plurality of child nodes ranked in a predetermined order for each service and add or delete one or more child nodes to/from one service in a renewal operation,
the inner-service link processing unit 401 for preparing a plurality of inner-service links (or buttons) to connect the parent node and each of the child nodes placed in the same service and serially connect the child nodes in the ranked order according to the service structural information, adding or deleting one or more inner-service links to/from one service in the renewal operation on condition that a layout of the child nodes in the renewed service is predetermined to serially arrange the child nodes in the ranked order,
the service storing unit 103, the inter-service link processing unit 104, the inter-service link information storing unit 105, the hyper-text document preparing unit 106, and the hyper-text document storing unit 107.

In the above configuration, as shown in FIG. 11, when a user intends to newly prepare a particular service, the user specifies the particular service, and a parent node 701 and a plurality of child nodes consisting of a top child node 702, one or more intermediary child nodes 703 and a final child node 704 ranked in that order are prepared in the node preparing unit 411. Thereafter, a first type of button form indicating that a reference position proceeds to each of the child nodes 702 to 704 is automatically generated in the button form generating unit 403 according to the service structural information and is allocated to a patent button 705, a second type of button form indicating that a reference position proceeds from the top child node 702 to an intermediary child node 703 and another reference position proceeds to the parent node 701 is automatically generated in the button form generating unit 403 according to the service structural information and is allocated to a top child button 706, a third type of button form indicating that a reference position proceeds from a first child node to a second child node having a rank lower than the first child node by one rank, another reference position returns from the first child node to a third child node having a rank higher than the first child node by one rank and another reference position proceeds to the parent node 701 is automatically generated in the button form generating unit 403 according to the service structural information and is allocated to each of one or more intermediary child buttons 707, and a fourth type of button form indicating that a reference position returns from the final child node 704 to an intermediary child node 703 having a rank higher than the final child node 704 by one rank and another reference position proceeds to the parent node 701 is automatically generated in the button form generating unit 403 according to the service structural information and is allocated to a final intermediary button 708. Thereafter, the patent button 705 is set in the parent node 701, the top child button 706 is set in the top child node 702, each of the intermediary child buttons 707 is set in one of the intermediary child nodes 703, and the final child button 708 is set in the final child node 704.

Therefore, the top child node 702, the intermediary child nodes 703 and the final child node 704 are arranged in the ranked order. In this case, a plurality of headlines 705 of pieces of information indicated by the child nodes 702 to 704 are indicated by the parent node 701 in a list form, and the parent node 701 functions as a representative node of the particular service.

Accordingly, because the buttons 705 to 708 to which the first, second, third or fourth type of button form is allocated are automatically set in the nodes 701 to 704, a service having a referential relationship among the nodes 701 to 704 can be easily prepared and managed.

Also, a service in which one parent node is connected with each of a plurality of child nodes arranged in the ranked order can be efficiently prepared and managed.

Having illustrated and described the principles of the present invention in a preferred embodiment thereof, it should be readily apparent to those skilled in the art that the invention can be modified in arrangement and detail without departing from such principles. We claim all modifications coming within the scope of the accompanying claims.

What is claimed is:

1. A hyper-text document preparing apparatus, comprising:

document classifying means for classifying a plurality of elements of a document into a plurality of services;

node preparing means for preparing a plurality of nodes respectively indicating one element of the document for each of the services classified by the document classifying means, each of the services denoting a partial set of nodes;

structural information storing means for storing pieces of service structural information respectively indicating a geometrical layout of the nodes in the same service;

layout managing means for selecting one piece of service structural information stored in the structural information storing means for each service classified by the document classifying means to manage the geometrical layout of the nodes for each service;

inner-service link preparing means for automatically generating a plurality of inner-service links respectively connecting two nodes of the same service classified by the document classifying means to each other according to the service structural information selected by the layout managing means for each service to make a reference relationship from each node to another node for each service and automatically setting the inner-service links in each corresponding service to automatically connect the nodes of the service to each other through the inner-service links in the geometrical layout, which is indicated by the corresponding service structural information selected by the layout managing means, for each service;

inter-service link preparing means for preparing a plurality of inter-service links respectively connecting two nodes of the different services classified by the document classifying means to make a reference relationship from one node of a service to one node of another service; and a hyper-text document preparing means for preparing a hyper-text document from the nodes prepared by the node preparing means, the inner-service links automatically set by the inner-service link preparing means and the inter-service by the inter-service link preparing means.

2. A hyper-text document preparing apparatus according to claim 1 in which the nodes placed in each of the services relate to the same meaning.

3. A hyper-text document preparing apparatus according to claim 1 in which each piece of service structural information stored in the structural information storing means is composed of a piece of layout information indicating the geometrical layout the nodes in the one service and a piece of maintenance information indicating a maintenance method for the inner-service links of the service in a node renewal such as a node addition or a node deletion, and a particular node is added to a particular service classified by the document classifying means while automatically setting one or more additional inner-service links in the particular service according to the maintenance information of the corresponding service structural information to connect the particular node to the nodes of the particular service.

4. A hyper-text document preparing apparatus according to claim 1 in which the nodes prepared by the node preparing means for a particular service are arranged in a ranked order according to the piece of corresponding service structural information selected by the layout managing means, and each inner-service link of the particular service set by the inner-service link preparing means indicates that a reference position proceeds from a first node to a second node having a rank lower than the first node by one rank or a reference position returns from the first node to a third node having a rank higher than the first node by one rank.

5. A hyper-text document preparing apparatus according to claim 1 in which the nodes prepared by the node preparing means for a particular service are classified into a parent node and a plurality of child nodes according to the piece of corresponding service structural information selected by the layout managing means, and each inner-service link of the particular service set by the inner-service link preparing means indicates that a reference position proceeds to one child node or that a reference position proceeds to the parent node.

6. A hyper-text document preparing apparatus according to claim 1 in which the nodes prepared by the node preparing means for a particular service are classified into a parent node and a plurality of child nodes arranged in a ranked order according to the piece of corresponding service structural information selected by the layout managing means, and each inner-service link of the particular service set by the inner-service link preparing means indicates that a reference position proceeds from one child node to each of the child nodes, a reference position proceeds from one child node to the parent node, a reference position proceeds from a first child node to a second child node having a rank lower than the first child node by one rank or a reference position returns from the first child node to a third child node having a rank higher than the first child node by one rank.

* * * * *